(12) United States Patent
Toya

(10) Patent No.: US 10,373,401 B2
(45) Date of Patent: Aug. 6, 2019

(54) METHOD FOR CONTROLLING INFORMATION TERMINAL AND INFORMATION TERMINAL

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 265 days.

(21) Appl. No.: 15/220,366

(22) Filed: Jul. 26, 2016

(65) Prior Publication Data

US 2017/0061709 A1 Mar. 2, 2017

(30) Foreign Application Priority Data

Aug. 28, 2015 (JP) .................................. 2015-169806

(51) Int. Cl.
*G07C 5/00* (2006.01)
*G05B 19/408* (2006.01)
*G06Q 30/06* (2012.01)
*G07C 5/08* (2006.01)
*G06F 21/86* (2013.01)
*G06F 8/61* (2018.01)
*G07C 9/00* (2006.01)

(52) U.S. Cl.
CPC ......... *G07C 5/008* (2013.01); *G05B 19/4083* (2013.01); *G06F 8/61* (2013.01); *G06F 21/86* (2013.01); *G06Q 30/0645* (2013.01); *G07C 5/085* (2013.01); *G07C 9/00166* (2013.01); *G05B 2219/33246* (2013.01)

(58) Field of Classification Search
CPC .... G07C 5/008; G07C 5/085; G05B 19/4083; G06F 8/61; G06F 21/86; G06Q 30/0645
USPC .......................................................... 340/5.2
See application file for complete search history.

(56) References Cited

U.S. PATENT DOCUMENTS

| | | | | | |
|---|---|---|---|---|---|
| 6,154,006 | A | * | 11/2000 | Hatanaka | B60L 11/1801 320/107 |
| 6,157,315 | A | * | 12/2000 | Kokubo | G07B 15/00 211/5 |
| 2013/0066791 | A1 | * | 3/2013 | Sakamoto | G06Q 30/06 705/307 |
| 2014/0253021 | A1 | * | 9/2014 | Luke | H02J 7/0013 320/107 |
| 2015/0074004 | A1 | * | 3/2015 | Song | G07F 17/0057 705/307 |

(Continued)

FOREIGN PATENT DOCUMENTS

| | | |
|---|---|---|
| JP | 2001-306961 | * 11/2001 |
| JP | 2008-250786 | 10/2008 |

*Primary Examiner* — Omar Casillashernandez
(74) *Attorney, Agent, or Firm* — Greenblum & Bernstein, P.L.C.

(57) ABSTRACT

A method for controlling an information terminal includes: (a) transmitting a signal for unlocking an electric storage device locked in an unusable state to the electric storage device at at least one of a timing after a user's instruction to install a program, in an information terminal, for transmitting history information of a state of the electric storage device to a server device is accepted and a timing after a user's instruction to activate the program in the information terminal is accepted.

19 Claims, 12 Drawing Sheets

(56) References Cited

U.S. PATENT DOCUMENTS

2015/0206229 A1* 7/2015 Kang ................. G06Q 30/0645
705/26.3
2015/0254760 A1* 9/2015 Pepper ............... G06Q 30/0645
705/5

* cited by examiner

FIG. 5

| USER ID | ELECTRIC STORAGE DEVICE ID | RETURN DEADLINE | RETURN DATE | UPDATE DEADLINE | TOTAL AMOUNT OF DISCHARGE | TEMPERATURE |
|---|---|---|---|---|---|---|
| 00001 | 001001 | 2015/08/15 | | 2015/08/07 | 600 | HIGH |
| 00002 | 001002 | 2015/07/31 | | 2015/08/09 | 200 | MEDIUM |
| 00003 | 001003 | 2015/09/30 | | 2015/08/06 | 5 | LOW |
| 00004 | 001004 | 2015/10/01 | | 2015/08/12 | 300 | MEDIUM |
| 00005 | 001005 | 2015/10/01 | | 2015/08/12 | 100 | MEDIUM |

58

METHOD FOR CONTROLLING INFORMATION TERMINAL AND INFORMATION TERMINAL

BACKGROUND

1. Technical Field

The present disclosure relates to a method for controlling an information terminal and an information terminal.

2. Description of the Related Art

A rental service for renting, to a user, an electric storage device for feeding electric power, for example, to an electric bicycle, an electric scooter, an electric car, or the like is known (see, for example, Japanese Unexamined Patent Application Publication No. 2001-306961 and Japanese Unexamined Patent Application Publication No. 2008-250786). In this rental service, history information of a state of the electric storage device is transmitted from a user's information terminal to a server device of a management center, and a use state and the like of the electric storage device is thus managed in the server device.

However, according to the conventional technique, there are cases where a user continues to use an electric storage device without transmission of history information of a state of the electric storage device to a server device. In such cases, there is a problem that a use state and the like of the electric storage device cannot be properly managed in the server device.

SUMMARY

One non-limiting and exemplary embodiment provides a method for controlling an information terminal and an information terminal that make it easier to properly manage a use state and the like of an electric storage device in a server device.

In one general aspect, the techniques disclosed here feature a method including: (a) transmitting a signal for unlocking an electric storage device locked in an unusable state to the electric storage device at at least one of a timing after an operator's instruction to install a program, in an information terminal, for transmitting history information of a state of the electric storage device to a server device is accepted and a timing after an operator's instruction to activate the program in the information terminal is accepted.

According to a method for controlling an information terminal and an information terminal of the present disclosure, it becomes easier to properly manage a use state and the like of an electric storage device in a server device.

It should be noted that general or specific embodiments may be implemented as a system, a method, an integrated circuit, a computer program, a computer-readable storage medium such as a CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating an example of a management table managed in a server device according to Embodiment 1;

DETAILED DESCRIPTION

Figure 1:
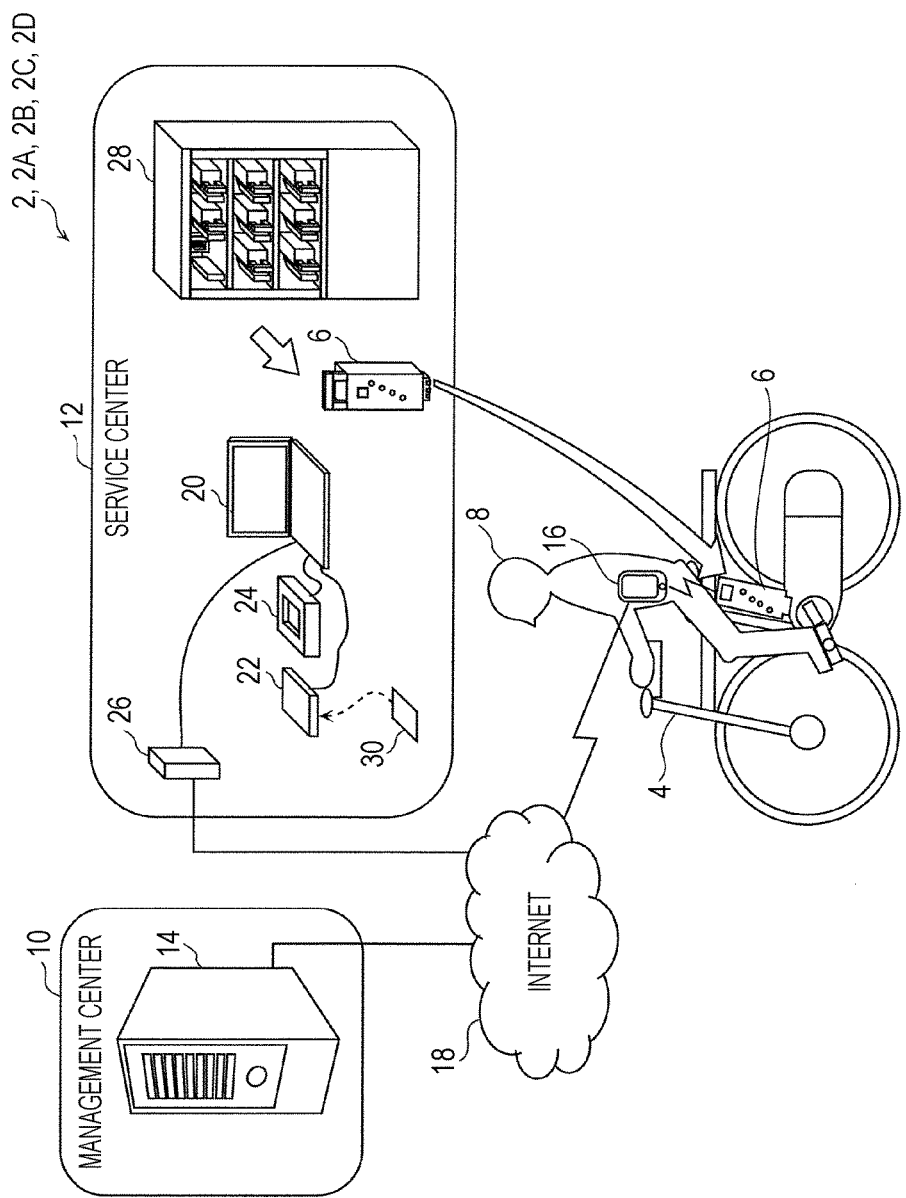
FIG. 1 is a diagram illustrating an overall configuration of a rental system according to Embodiment 1 (through 5)

A method according to a first aspect of the present disclosure includes (a) transmitting a signal for unlocking an electric storage device locked in an unusable state to the electric storage device at at least one of a timing after an operator's instruction to install a program, in an information terminal, for transmitting history information of a state of the electric storage device to a server device is accepted and a timing after an operator's instruction to activate the program in the information terminal is accepted.

According to the first aspect, the signal is transmitted from the information terminal to the electric storage device to unlock the electric storage device after the operator completes preparation (at least one of installation of the program or activation of the program) for transmission of the history information of the state of the electric storage device from the information terminal to the server device. This makes it possible to reduce occurrence of a situation where the user of the electric storage device continues to use the electric storage device without transmission of the history information of the state of the electric storage device to the server device. As a result, it becomes easier to properly manage a use state and the like of the electric storage device in the server device.

Note that the "timing after an operator's instruction to install the program" may be any timing after the instruction to install the program is accepted. Specifically, the "timing after an operator's instruction to install the program" may be any of a timing during a period from acceptance of the instruction to install the program to the start of installation, a timing during installation, and a timing after completion of installation. Note also that the "timing after an operator's instruction to activate the program is accepted" may be any timing after the instruction to activate the program is accepted. Specifically, the "timing after an operator's instruction to activate the program is accepted" may be any of a timing during a period from acceptance of the instruction to activate the program to the start of activation, a timing during activation, and a timing after completion of activation.

In the method according to the first aspect, for example, a method for controlling an information terminal according to a second aspect of the present disclosure may be arranged such that the signal for unlocking the electric storage device is transmitted to the electric storage device upon acceptance of the operator's instruction to install the program.

According to the second aspect, the signal can be transmitted to the electric storage device upon acceptance of the operator's instruction to install the program.

In the method according to the first aspect, for example, a method for controlling an information terminal according to a third aspect of the present disclosure may be arranged such that the signal for unlocking the electric storage device is transmitted to the electric storage device upon completion of installation of the program.

According to the third aspect, the signal can be transmitted to the electric storage device upon completion of installation of the program.

In the method according to the first aspect, for example, a method for controlling an information terminal according to a fourth aspect of the present disclosure may be arranged to further include (b) displaying, on a display, a screen for confirming transmission of the signal for unlocking the electric storage device after the operator's instruction to install the program is accepted, wherein the step (a) is executed upon acceptance of an operator's instruction to transmit the signal for unlocking the electric storage device to the electric storage device after the step (b).

According to the fourth aspect, since the screen for confirming transmission of the signal for unlocking the electric storage device is displayed on the display, the user can give an instruction to transmit the signal to the electric storage device in accordance with this screen.

In the method according to the first aspect, for example, a method for controlling an information terminal according to a fifth aspect of the present disclosure may be arranged such that the signal for unlocking the electric storage device is transmitted to the electric storage device upon acceptance of the operators instruction to activate the program.

According to the fifth aspect, the signal can be transmitted to the electric storage device upon acceptance of the operator's instruction to activate the program.

In the method according to the first aspect, for example, a method for controlling an information terminal according to a sixth aspect of the present disclosure may be arranged such that the signal for unlocking the electric storage device is transmitted to the electric storage device upon completion of activation of the program.

According to the sixth aspect, the signal can be transmitted to the electric storage device upon completion of activation of the program.

In the method according to the first aspect, for example, a method for controlling an information terminal according to a seventh aspect of the present disclosure may be arranged to further include (c) displaying, on a display, a screen for confirming transmission of the signal for unlocking the electric storage device after the operators instruction to activate the program is accepted, wherein the step (a) is executed upon acceptance of an operators instruction to transmit the signal for unlocking the electric storage device to the electric storage device after the step (c).

According to the seventh aspect, since the screen for confirming transmission of the signal for unlocking the electric storage device is displayed on the display, the user can give an instruction to transmit the signal to the electric storage device in accordance with this screen.

In the method according to the first aspect, for example, a method for controlling an information terminal according to an eighth aspect of the present disclosure may be arranged to further include (d) transmitting at least one of information concerning the electric storage device and information concerning a user of the electric storage device to the server device, wherein the step (a) is executed after the step (d).

According to the eighth aspect, since at least one of the information concerning the electric storage device and the information concerning the user of the electric storage device is transmitted to the server device, at least one of the information concerning the electric storage device to be unlocked and the information concerning the user of the electric storage device can be managed in the server device.

In the method according to the fourth aspect, for example, a method for controlling an information terminal according to a ninth aspect of the present disclosure may be arranged to further include (d) transmitting at least one of information concerning the electric storage device and information concerning a user of the electric storage device to the server device, the step (b) is executed after the step (d).

According to the ninth aspect, since at least one of the information concerning the electric storage device and the information concerning the user of the electric storage device is transmitted to the server device, at least one of the information concerning the electric storage device to be unlocked and the information concerning the user of the electric storage device can be managed in the server device.

In the method according to the seventh aspect, for example, a method for controlling an information terminal according to a tenth aspect of the present disclosure may be arranged to further include (d) transmitting at least one of information concerning the electric storage device and information concerning a user of the electric storage device to the server device, the step (c) is executed after the step (d).

According to the tenth aspect, since at least one of the information concerning the electric storage device and the information concerning the user of the electric storage device is transmitted to the server device, at least one of the information concerning the electric storage device to be unlocked and the information concerning the user of the electric storage device can be managed in the server device.

In the method according to any one of the eighth through tenth aspects, for example, a method for controlling an information terminal according to an eleventh aspect of the present disclosure may be arranged to further include (e) displaying, on a display, a screen for confirming transmission of the at least one of the information concerning the electric storage device and the information concerning the user of the electric storage device to the server device after the operator's instruction to activate the program is accepted, the step (d) is executed upon acceptance of an operators instruction to transmit the at least one of the information concerning the electric storage device and the information concerning the user of the electric storage device to the server device after the step (e).

According to the eleventh aspect, since the screen for confirming transmission of at least one of the information concerning the electric storage device and the information concerning the user of the electric storage device to the server device is displayed on the display, the user can give an instruction to transmit the information to the server device in accordance with this screen.

In the method according to any one of the eighth through eleventh aspects, for example, a method for controlling an information terminal according to a twelfth aspect of the present disclosure may be arranged such that information concerning an electric apparatus in which the electric storage device is mounted is further transmitted in the step (d).

According to the twelfth aspect, information concerning the electric apparatus in which the electric storage device to be unlocked is mounted can be managed in the server device.

In the method according to any one of the eighth through twelfth aspects, for example, a method for controlling an information terminal according to a thirteenth aspect of the present disclosure may be arranged such that data in which identification information of the electric storage device and identification information of the user of the electric storage device are associated with each other is further transmitted to the server device in the step (d).

According to the thirteenth aspect, the identification information of the electric storage device and the identification information of the user of the electric storage device can be managed in association with each other in the server device.

In the method according to the thirteenth aspect, for example, a method for controlling an information terminal according to a fourteenth aspect of the present disclosure may be arranged such that information concerning an electric apparatus in which the electric storage device is mounted is further associated in the data.

According to the fourteenth aspect, information concerning the electric apparatus in which the electric storage device is mounted can be managed in the server device.

In the method according to any one of the first through fourteenth aspects, for example, a method for controlling an information terminal according to a fifteenth aspect of the present disclosure may be arranged such that the program is a program for acquiring the history information of the state of the electric storage device from the electric storage device and then transmitting the history information of the state of the electric storage device to the server device.

According to the fifteenth aspect, the information terminal can acquire the history information of the state of the electric storage device from the electric storage device and then transmit the history information of the state of the electric storage device to the server device on the basis of the installed program.

An information terminal according to a sixteenth aspect of the present disclosure includes an acceptor that accepts an operator's instruction to install a program for transmitting history information of a state of an electric storage device to a server device; a communicator that communicates with the electric storage device; and a controller that transmits a signal for unlocking the electric storage device locked in an unusable state to the electric storage device via the communicator at at least a timing after the acceptor accepts an operator's instruction to install the program and a timing after the acceptor accepts an operator's instruction to activate the program.

According to the sixteenth aspect, the signal is transmitted from the information terminal to the electric storage device to unlock the electric storage device after the operator completes preparation (at least one of installation of the program or activation of the program) for transmission of the history information of the state of the electric storage device from the information terminal to the server device. This makes it possible to reduce occurrence of a situation where the user of the electric storage device continues to use the electric storage device without transmission of the history information of the state of the electric storage device to the server device. As a result, it becomes easier to properly manage a use state and the like of the electric storage device in the server device.

It should be noted that general or specific embodiments may be implemented as a system, a method, an integrated circuit, a computer program, a computer-readable storage medium such as a CD-ROM, or any selective combination thereof.

Embodiments are specifically described below with reference to the drawings.

Note that each of the embodiments described below illustrates a general or specific example. Numerical values, shapes, materials, constituent elements, the positions of the constituent elements, the way in which the constituent elements are connected, steps, the order of steps, and the like in the embodiments below are examples and do not limit the present disclosure. Among constituent elements in the embodiments described below, constituent elements that are not described in independent claims that indicate the highest concepts are described as optional constituent elements.

Embodiment 1

1-1. Overall Configuration of Rental System

First, an overall configuration of a rental system 2 according to Embodiment 1 is described with reference to FIG. 1. FIG. 1 is a diagram illustrating an overall configuration of the rental system 2 according to Embodiment 1.

As illustrated in FIG. 1, the rental system 2 according to Embodiment 1 is a system that realizes a rental service for renting an electric storage device 6 mounted in an electric apparatus 4 to a user 8. This rental system 2 is managed by a management center 10 and a service center 12.

The electric storage device 6 is a battery pack that can be charged and discharged. The electric storage device 6 is detachably mounted in the electric apparatus 4 and feeds electric power to the electric apparatus 4.

The electric apparatus 4 is an apparatus driven by electric power fed by the electric storage device 6 mounted in the electric apparatus 4. The electric apparatus 4 is, for example, an electric bicycle. The user 8 who tries to use the electric apparatus 4 detachably mounts, in the electric apparatus 4, the electric storage device 6 rented in the service center 12. When a return deadline of the electric storage device 6 approaches, the user 8 detaches the electric storage device 6 from the electric apparatus 4 and returns the electric storage device 6 to the service center 12.

In the management center 10, a use state and the like of the electric storage device 6 rented to the user 8 are managed. The management center 10 includes the server device 14.

The server device 14 communicates with an information terminal 16 (described later) operated by the user 8 who is an operator and with a processing device 20 (described later) of the service center 12 over Internet 18 and manages various data concerning the electric storage device 6 and the user 8. The server device 14 is, for example, a cloud server.

In the service center 12, the electric storage device 6 is rented to the user 8, and the rented electric storage device 6 is returned from the user 8.

Furthermore, in the service center 12, the electric storage device 6 returned from the user 8 is, for example, inspected and charged. The service center 12 includes the processing device 20, a card reader 22, an inspection device 24, a relay device 26, and a charging device 28.

The processing device 20 communicates with the server device 14 of the management center 10 over the Internet 18 and processes data for the rental service. For example, the processing device 20 transmits a user ID and an electric storage device ID to the server device 14 when the electric storage device 6 is rented or returned. Note that the user ID is identification information for identifying the user 8 who is a member of the rental service. The electric storage device ID is identification information for identifying the electric storage device 6 rented to the user 8.

The card reader 22 reads out a user ID from a membership card 30 and then supplies the user ID to the processing device 20. The membership card 30 is given to the user 8 from a business operator that manages the rental service when the user 8 is registered as a member of the rental service. The user ID is stored in the membership card 30. For example, the membership card 30 is an IC (Integrated Circuit) card, and the card reader 22 is an IC card reader.

The inspection device 24 acquires an electric storage device ID from the electric storage device 6 and then supplies the electric storage device ID to the processing device 20. Furthermore, the inspection device 24 inspects the electric storage device 6 returned from the user 8 and then supplies a result of the inspection to the processing device 20. For example, the inspection device 24 inspects a discharge capacity, a charge capacity, and the like by electrifying the electric storage device 6.

The relay device 26 relays communication between the processing device 20 and the server device 14. The relay device 26 is, for example, a router.

The charging device 28 is a rack-type charging device that can charge a plurality of electric storage devices 6 concurrently. The electric storage device 6 is detachably attached to the charging device 28, and thus the electric storage device 6 is charged.

The information terminal 16 is a mobile terminal (e.g., a smartphone) operated by the user 8. The information terminal 16 communicates with the server device 14 over the Internet 18 and communicates with the electric storage device 6 through near field communication. The information terminal 16 transfers data received from the electric storage device 6 to the server device 14 and transfers data received from the server device 14 to the electric storage device 6. Note that near field communication is, for example, Bluetooth (Registered Trademark), wireless LAN (Local Area Network), infrared communication, or the like.

1-2. Functional Elements of Electric Storage Device

Figure 2:
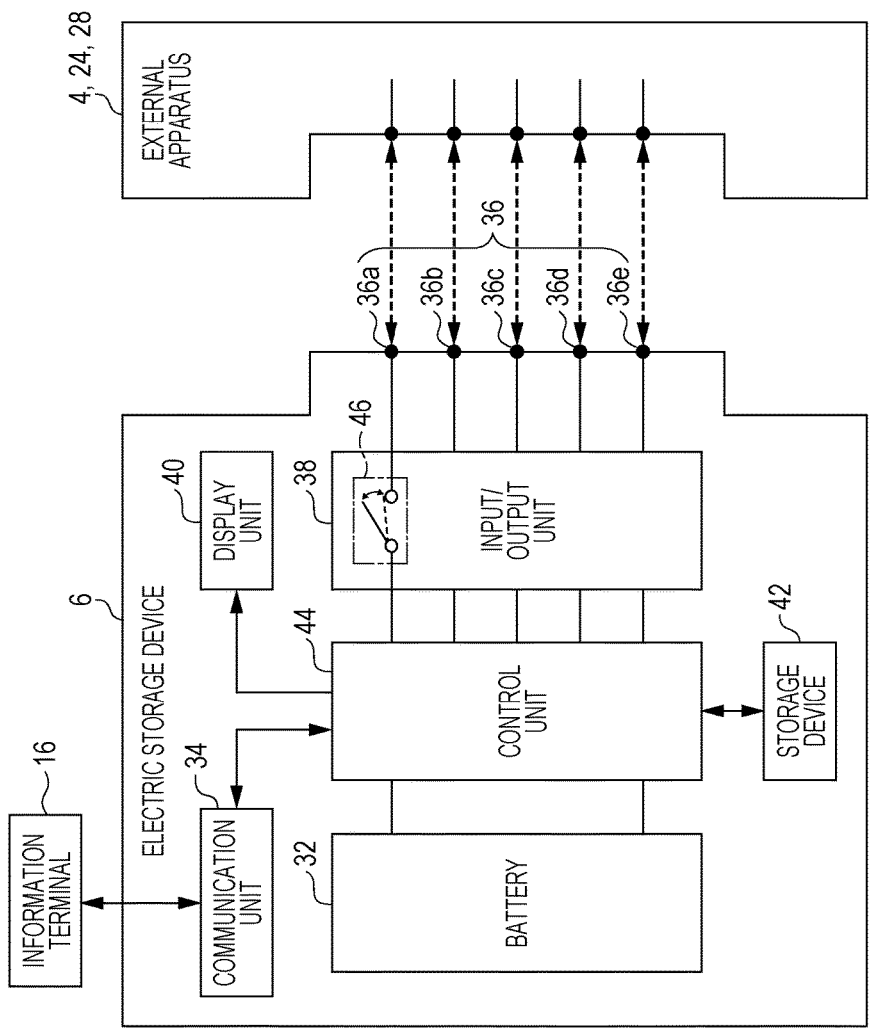
FIG. 2 is a block diagram illustrating functional elements of an electric storage device according to Embodiment 1.

Next, functional elements of the electric storage device 6 according to Embodiment 1 are described with reference to FIG. 2. FIG. 2 is a block diagram illustrating the functional elements of the electric storage device 6 according to Embodiment 1.

As illustrated in FIG. 2, the electric storage device 6 includes a battery 32, a communication unit 34, a plurality of terminals 36, an input/output unit 38, a display unit 40, a storage unit 42, and a control unit 44.

The battery 32 is a secondary battery that can be charged and discharged. The battery 32 is, for example, a lithium-ion battery, a lithium-ion polymer battery, a nickel-metal hydride battery, or the like.

The communication unit 34 is a communication adopter for communicating with the information terminal 16 through near field communication. For example, the communication unit 34 transmits an electric storage device ID and history information (described later) of a state of the electric storage device 6 that are stored in the storage unit 42 to the information terminal 16. Furthermore, the communication unit 34 receives an unlocking signal (described later) transmitted from the information terminal 16.

The plurality of terminals 36 are terminals for electrically connecting the electric storage device 6 and an external apparatus and includes a discharge terminal 36a, a charge terminal 36b, a communication terminal 36c, an ID terminal 36d, and a ground terminal 36e. The external apparatus is an apparatus that is provided outside the electric storage device 6 and is, for example, the electric apparatus 4, the inspection device 24, the charging device 28, or the like.

The discharge terminal 36a is a terminal for discharging the battery 32 and is connected to the battery 32 via the input/output unit 38. That is, electric power from the battery 32 is fed to the external apparatus via the discharge terminal 36a.

The charge terminal 36b is a terminal for charging the battery 32 and is connected to the battery 32 via the input/output unit 38. That is, electric power from the charging device 28 is fed to the battery 32 via the charge terminal 36b and is stored in the battery 32.

The communication terminal 36c is a communication for communicating with the external apparatus. For example, the electric storage device ID stored in the storage unit 42 is transmitted to the inspection device 24 via the communication terminal 36c.

The ID terminal 36d is a terminal for identifying a type of the external apparatus. For example, the control unit 44 (described later) determines whether or not the external apparatus is a load apparatus on the basis of whether or not the ID terminal 36d is grounded when a terminal of the external apparatus is connected to the ID terminal 36d.

The ground terminal 36e is a terminal that is grounded to the external apparatus.

The input/output unit 38 locks (holds) the electric storage device 6 in an unusable state. Note that the unusable state is, for example, a state where discharge of the electric storage device 6 is prohibited. Specifically, the input/output unit 38 includes a switch 46 that switches a conduction state and a cut-off state of a circuit between the discharge terminal 36a and the battery 32. The switch 46 is, for example, a semiconductor switch such as a field-effect transistor (FET) and is turned on or off on the basis of a control signal supplied from the control unit 44. In a case where the switch 46 is turned off, the circuit between the discharge terminal 36a and the battery 32 is cut off so that the electric storage device 6 is locked in an unusable state. Meanwhile, in a case where the switch 46 is turned on, the circuit between the discharge terminal 36a and the battery 32 is made conductive so that the electric storage device 6 that has been locked in an unusable state is unlocked in a usable state. Note that the usable state is, for example, a state where discharge of the electric storage device 6 is permitted.

Note that the switch 46 may be a switch that switches a conduction state and a cut-off state of the circuit between the discharge terminal 36a and the battery 32 and switches a conduction state and a cut-off state of a circuit between the charge terminal 36b and the battery 32.

The display unit 40 is, for example, an LED (Light Emitting Diode). The display unit 40 is lit up on the basis of a control signal supplied from the control unit 44 when a remaining battery level of the battery 32 becomes lower than a threshold value. The user 8 can be notified that the remaining battery level of the battery 32 has become low on the basis of lighting of the display unit 40.

The storage unit 42 is, for example, a semiconductor memory or the like and stores various data therein. Specifically, the storage unit 42 stores therein the electric storage device ID, the history information of the state of the electric storage device 6, and the like. Note that the electric storage device ID and the history information of the state of the electric storage device 6 that are stored in the storage unit 42 are transmitted to the server device 14 via the communication unit 34 and the information terminal 16.

The history information of the state of the electric storage device 6 is, for example, history information of a total amount of discharge, a total amount of charge, the number of charges, the number of discharges, a voltage, an electric current, an internal resistance, a temperature, and the like of the electric storage device 6. Note that the history information of the state of the electric storage device 6 may include, for example, abnormality history information of a temperature abnormality, an electric current abnormality, a voltage abnormality, an impact abnormality, and the like.

The control unit 44 controls on and off of the switch 46. Specifically, upon receipt of an unlocking signal from the information terminal 16, the control unit 44 switches the switch 46 from off to on by supplying a control signal to the switch 46 of the input/output unit 38. Note that the unlocking signal is a signal for unlocking the electric storage device 6 that has been locked in an unusable state. Furthermore, the control unit 44 controls communication with the information terminal 16 by controlling the communication unit 34. Furthermore, the control unit 44 controls lighting on and off of the display unit 40 by supplying a control signal to the display unit 40.

Note that the control unit 44 may be realized in any ways, provided that the control unit 44 has a control function. For example, the control unit 44 may be realized by special hardware. Alternatively, for example, the control unit 44 may be realized by execution of software programs suitable for the constituent elements. In this case, the control unit 44 may include, for example, an arithmetic processing unit (not illustrated) and a storage unit (not illustrated) in which a control program is stored. An example of the arithmetic processing unit is an MPU (Micro Processing Unit) or a CPU (Central Processing Unit). An example of the storage unit is a memory. Furthermore, the control unit 44 may be made up of a single control unit 44 that performs centralized control or may be made up of a plurality of control units 44 that perform decentralized control in cooperation with one another.

1-3. Functional Elements of Information Terminal

Figure 3:
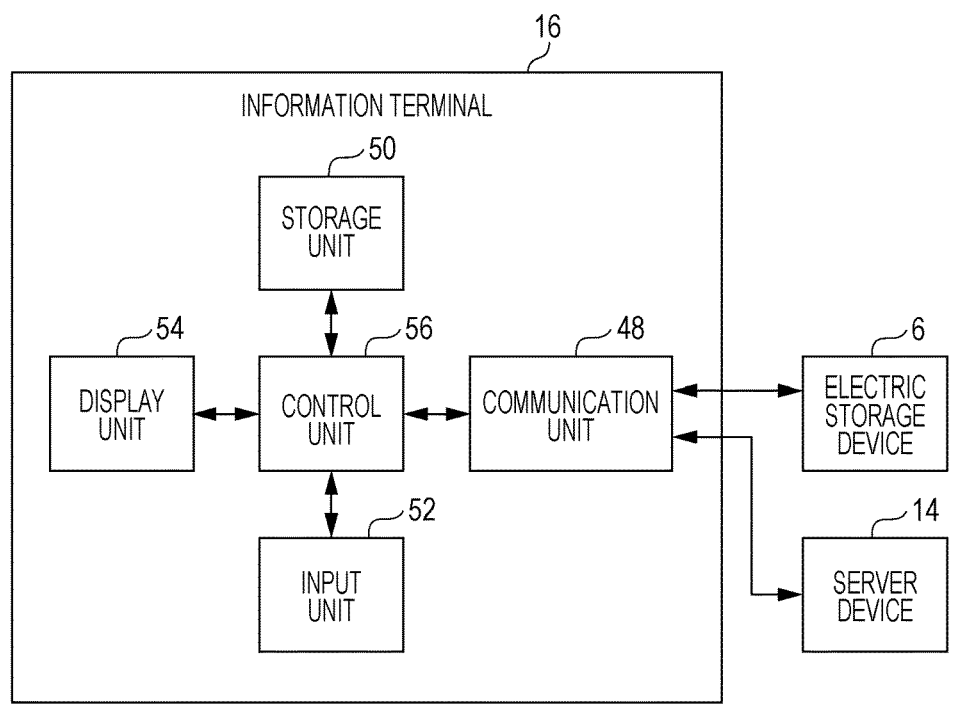
FIG. 3 is a block diagram illustrating functional elements of an information terminal according to Embodiment 1.

Next, functional elements of the information terminal 16 according to Embodiment 1 are described with reference to FIG. 3. FIG. 3 is a block diagram illustrating the functional elements of the information terminal 16 according to Embodiment 1.

As illustrated in FIG. 3, the information terminal 16 includes a communication unit 48, a storage unit 50, an input unit 52, a display unit 54, and a control unit 56.

The communication unit 48 is a communication adopter that communicates with the electric storage device 6 through near field communication and communicates with the server device 14 over the Internet 18. For example, the communication unit 48 transmits an unlocking signal to the electric storage device 6. Furthermore, the communication unit 48 receives the electric storage device ID and the history information of the state of the electric storage device 6 transmitted from the electric storage device 6. Furthermore, the communication unit 48 transmits, to the server device 14, data in which the electric storage device ID and the history information of the state of the electric storage device 6 received from the electric storage device 6 are associated with a user ID. Furthermore, the communication unit 48 receives a program (described later) downloaded from the server device 14. The communication unit 48 is an example of a communicator of the present disclosure.

Note that a feature of the rental system 2 according to Embodiment 1 lies in a timing of transmission of an unlocking signal to the electric storage device 6. The timing of transmission of an unlocking signal to the electric storage device 6 will be described later.

The storage unit 50 is, for example, a semiconductor memory or the like and stores various data therein. Specifically, the storage unit 50 stores therein the user ID and the program downloaded from the server device 14. Note that the program is an application program for acquiring the electric storage device ID and the history information of the state of the electric storage device 6 from the electric storage device 6 and then transmitting the acquired electric storage device ID and history information of the state of the electric storage device 6 to the server device 14 in association with the user ID.

The input unit 52 is a user interface that accepts various instructions from the user 8 and is, for example, a touch panel. For example, the input unit 52 accepts an instruction from the user 8 to install the program, an instruction from the user 8 to activate the program, and the like. The input unit 52 is an example of an acceptor of the present disclosure.

The display unit 54 is, for example, a liquid crystal panel and displays various screens.

The control unit 56 controls communication with the electric storage device 6 and communication with the server device 14 by controlling the communication unit 48. For example, the control unit 56 includes an arithmetic processing unit (not illustrated) and a storage unit (not illustrated) in which a control program is stored. An example of the arithmetic processing unit is an MPU or a CPU. An example of the storage unit is a memory. For example, on the basis of the program stored in the storage unit 50, the control unit 56 acquires the electric storage device ID and the history information of the state of the electric storage device 6 from the electric storage device 6 and then transmits the acquired electric storage device ID and history information of the state of the electric storage device 6 to the server device 14 in association with the user ID. Furthermore, the control unit 56 controls the communication unit 48 to transmit an unlocking signal to the electric storage device 6. Furthermore, the control unit 56 controls display content of the display unit 54. The aforementioned control of the control unit 56 is specifically executed as follows. The program stored in the storage unit 50 is transferred and stored in a storage unit of the control unit 56. The program stored in the storage unit of the control unit 56 causes the arithmetic processing unit to execute the aforementioned control. Note that the control unit 56 is an example of a controller of the present disclosure.

1-4. Processing of Rental System

Next, processing of the rental system 2 according to Embodiment 1 is described with reference to FIGS. 4 through 6.

1-4-1. Processing for Renting Electric Storage Device

First, processing for renting the electric storage device 6 is described with reference to FIG. 4. FIG. 4 is a sequence diagram illustrating the renting processing in the rental system 2 according to Embodiment 1.

Figure 4:
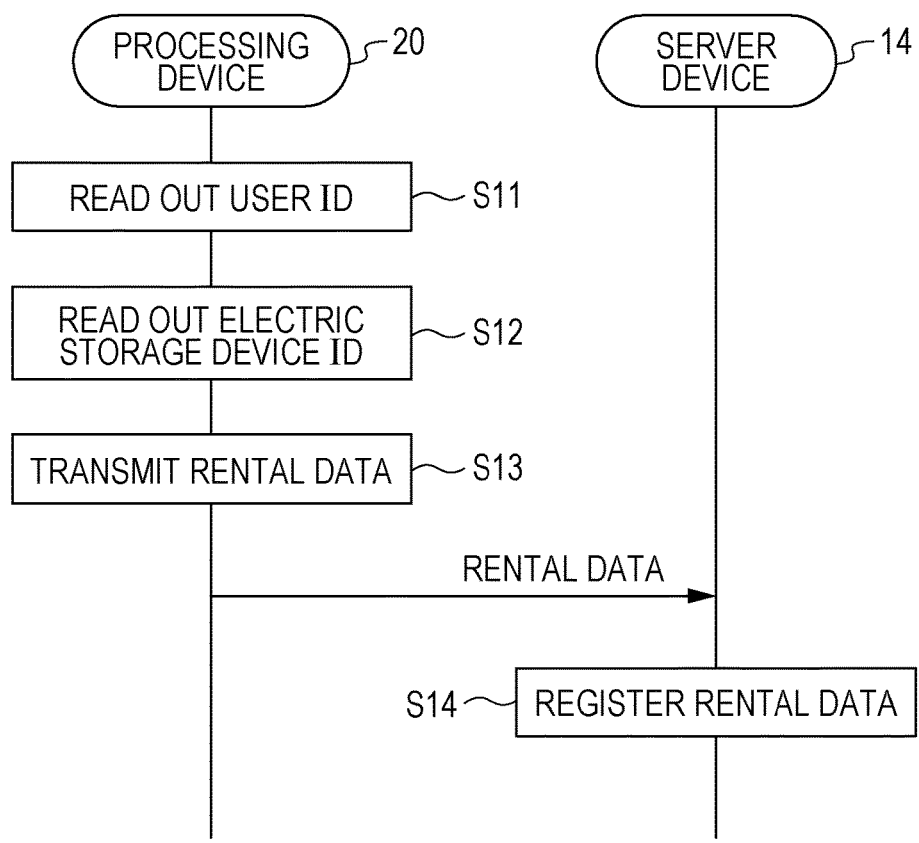
FIG. 4 is a sequence diagram illustrating rental processing in the rental system according to Embodiment 1.

As illustrated in FIG. 4, the user 8 who tries to use the rental service presents the membership card 30 in the service center 12. The processing device 20 reads out the user ID from the membership card 30 by using the card reader 22 (S11). Then, the processing device 20 reads out the electric storage device ID from the storage unit 42 of the electric storage device 6 to be rented by using the inspection device 24 (S12). At this point in time, the inspection device 24 may inspect the electric storage device 6.

Then, the processing device 20 transmits rental data to the server device 14 (S13). The rental data is data including at least the user ID and the electric storage device ID. Then, the server device 14 receives the rental data from the processing device 20 and then registers the rental data in a management table 58 (S14). The management table 58 is included in a database (not illustrated) of the server device 14. An example of the management table 58 will be described later.

Note that the electric storage device 6 rented to the user 8 is locked in an unusable state. Even if the electric storage device 6 locked in an unusable state is mounted in the electric apparatus 4, electric power from the electric storage device 6 is not fed to the electric apparatus 4, and therefore the electric apparatus 4 is not driven. A procedure for unlocking the electric storage device 6 will be described later.

An example of the management table 58 is described below with reference to FIG. 5. FIG. 5 is a diagram illustrating an example of the management table 58 managed in the server device 14 according to Embodiment 1.

As illustrated in FIG. 5, the management table 58 has fields "USER ID", "ELECTRIC STORAGE DEVICE ID", "RETURN DEADLINE", "RETURN DATE", "UPDATE DEADLINE", "TOTAL AMOUNT OF DISCHARGE", and "TEMPERATURE".

In the fields "USER ID" and "ELECTRIC STORAGE DEVICE ID", the user ID of the user 8 and the electric storage device ID of the electric storage device 6 rented to the user 8 are registered in association with each other. In Embodiment 1, new record is generated in the management table 58 when the server device 14 receives rental data, and a user ID and an electric storage device ID included in the rental data are registered in the record.

In the field "RETURN DEADLINE", a return deadline date of the rented electric storage device 6 is registered. For example, when the user ID and the electric storage device ID are registered, a return deadline date based on a rental period is registered in the field "RETURN DEADLINE". Note that, for example, the rental period may be included in the rental data or may be a predetermined fixed period.

In the field "RETURN DATE", a date of return of the rented electric storage device 6 is registered. In a case where the electric storage device 6 has not been returned yet, an effective date is not registered in the field "RETURN DATE".

In the field "UPDATE DEADLINE", a deadline date on which the history information of the state of the electric storage device 6 should be transmitted from the electric storage device 6 to the server device 14 is registered. The field "UPDATE DEADLINE" is updated on the basis of a predetermined update period, for example, when the server device 14 receives the history information of the state of the electric storage device 6 from the electric storage device 6.

In the field "TOTAL AMOUNT OF DISCHARGE", a total amount of discharge of the rented electric storage device 6 within a certain period is registered. The total amount of discharge is, for example, a value that quantitatively represents a total amount of electric power fed from the electric storage device 6 to the electric apparatus 4 within the certain period. Note that, for example, a total amount of charge of the rented electric storage device 6 within the certain period may be used instead of the total amount of discharge. The field "TOTAL AMOUNT OF DISCHARGE" is updated on the basis of a total amount of discharge indicated by the history information of the state of the electric storage device 6 when the server device 14 receives the history information of the state of the electric storage device 6 from the electric storage device 6.

In the field "TEMPERATURE", a temperature of the electric storage device 6 during the rental period is registered. The temperature is indicated, for example, by temperature ranges such as "HIGH", "MEDIUM", and "LOW". For example, the temperature indicates in which temperature range the highest temperature during use and nonuse of the electric storage device 6 is included. The field "TEMPERATURE" is updated as needed on the basis of a temperature indicated by the history information of the state of the electric storage device 6 when the server device 14 receives the history information of the state of the electric storage device 6 from the electric storage device 6.

1-4-2. Processing for Transmitting History Information of State of Electric Storage Device Next, processing for transmitting the history information of the state of the electric storage device 6 is described with reference to FIG. 6. FIG. 6 is a sequence diagram illustrating the processing for transmitting the history information of the state of the electric storage device 6 in the rental system 2 according to Embodiment 1.

In a case where the user 8 uses the rental service for the first time, first, the aforementioned program need be installed in the information terminal 16 as follows. As illustrated in FIG. 6, the user 8 causes the display unit 54 to display a web page of the rental service managed by the management center 10 by operating the information terminal 16 (S21). Then, the user 8 downloads the program from the server device 14 to the information terminal 16 by performing an operation for downloading the program on this web page (S22).

Then, the input unit 52 of the information terminal 16 accepts an instruction from the user 8 to install the program, and thus the information terminal 16 starts installing the program (S23). Upon acceptance of the instruction from the user 8 to install the program by the input unit 52, the control unit 56 controls the communication unit 48 to transmit an unlocking signal to the electric storage device 6. For example, the control unit 56 controls the communication unit 48 to transmit the unlocking signal to the electric storage device 6 on the basis of a determination signal indicating that the instruction to install the program has been accepted. This allows the unlocking signal to be transmitted from the information terminal 16 to the electric storage device 6 (S24) (Step (a)). That is, transmission of the unlocking signal is executed after the input unit 52 accepts the instruction from the user 8 to install the program.

Note that a timing of transmission of the unlocking signal may be the same as a timing at which the input unit 52 accepts the instruction from the user 8 to install the program or may be any timing after the timing at which the input unit 52 accepts the instruction from the user 8 to install the program. Transmission of the unlocking signal is executed, for example, on the basis of another program that is installed in advance in the information terminal 16.

Upon receipt of the unlocking signal from the information terminal 16, the control unit 44 switches the switch 46 from off to on by supplying a control signal to the switch 46 of the input/output unit 38. This unlocks the electric storage device 6 that has been locked in an unusable state (S25), thereby allowing the electric storage device 6 to be in a usable state. Then, installation of the program in the information terminal 16 is completed (S26), and the installed program is stored in the storage unit 50.

The user 8 mounts the unlocked electric storage device 6 in the electric apparatus 4. This allows electric power from the electric storage device 6 to be fed to the electric apparatus 4, thereby driving the electric apparatus 4. During a period in which the user 8 uses the electric storage device 6, the history information of the state of the electric storage device 6 is accumulated in the storage unit 42 of the electric storage device 6.

Upon arrival of the update deadline (see FIG. 5) of the history information of the state of the electric storage device 6, a notification requesting transmission of the history information of the state of the electric storage device 6 is given from the server device 14 to the information terminal 16. This notification is given, for example, by transmission of an e-mail from the server device 14 to the information terminal 16. Upon receipt of this notification, the user 8 activates the installed program by operating the information terminal 16 (S27).

Upon activation of the program, an instruction to request transmission of the electric storage device ID and the history information of the state of the electric storage device 6 is transmitted from the information terminal 16 to the electric storage device 6. Upon receipt of this instruction, the electric storage device 6 transmits, to the information terminal 16, the electric storage device ID and the history information of the state of the electric storage device 6 that are stored in the storage unit 42 (S28). Then, the information terminal 16 transmits, to the server device 14, data in which the electric storage device ID and the history information of the state of the electric storage device 6 that are received from the electric storage device 6 are associated with the user ID stored in the storage unit 50 (S29).

Upon receipt of the data from the electric storage device 6, the server device 14 accumulates the history information of the state of the electric storage device 6 included in the data in association with the electric storage device ID (S30). Then, the server device 14 updates the management table 58 on the basis of the received user ID, the electric storage device ID, and the history information of the state of the electric storage device 6 (S31). For example, the server device 14 updates the total amount of discharge and temperature in the management table 58 that correspond to the electric storage device ID on the basis of a total amount of discharge and temperature included in the history information of the state of the electric storage device 6.

1-5. Effects

Next, effects obtained by the method for controlling the information terminal 16 according to Embodiment 1 are described. As described above, an unlocking signal is transmitted from the information terminal 16 to the electric storage device 6 after the input unit 52 accepts an instruction from the user 8 to install the program. That is, after the user 8 completes preparation (installation of the program) for transmission of the history information of the state of the electric storage device 6 from the information terminal 16 to the server device 14, an unlocking signal is transmitted from the information terminal 16 to the electric storage device 6 to unlock the electric storage device 6.

This makes it possible to reduce occurrence of a situation where the user 8 continues to use the electric storage device 6 without transmission of the history information of the state of the electric storage device 6 to the server device 14. As a result, it becomes to easier to properly manage a use state and the like of the electric storage device 6 in the server device 14.

Embodiment 2

Figure 7:
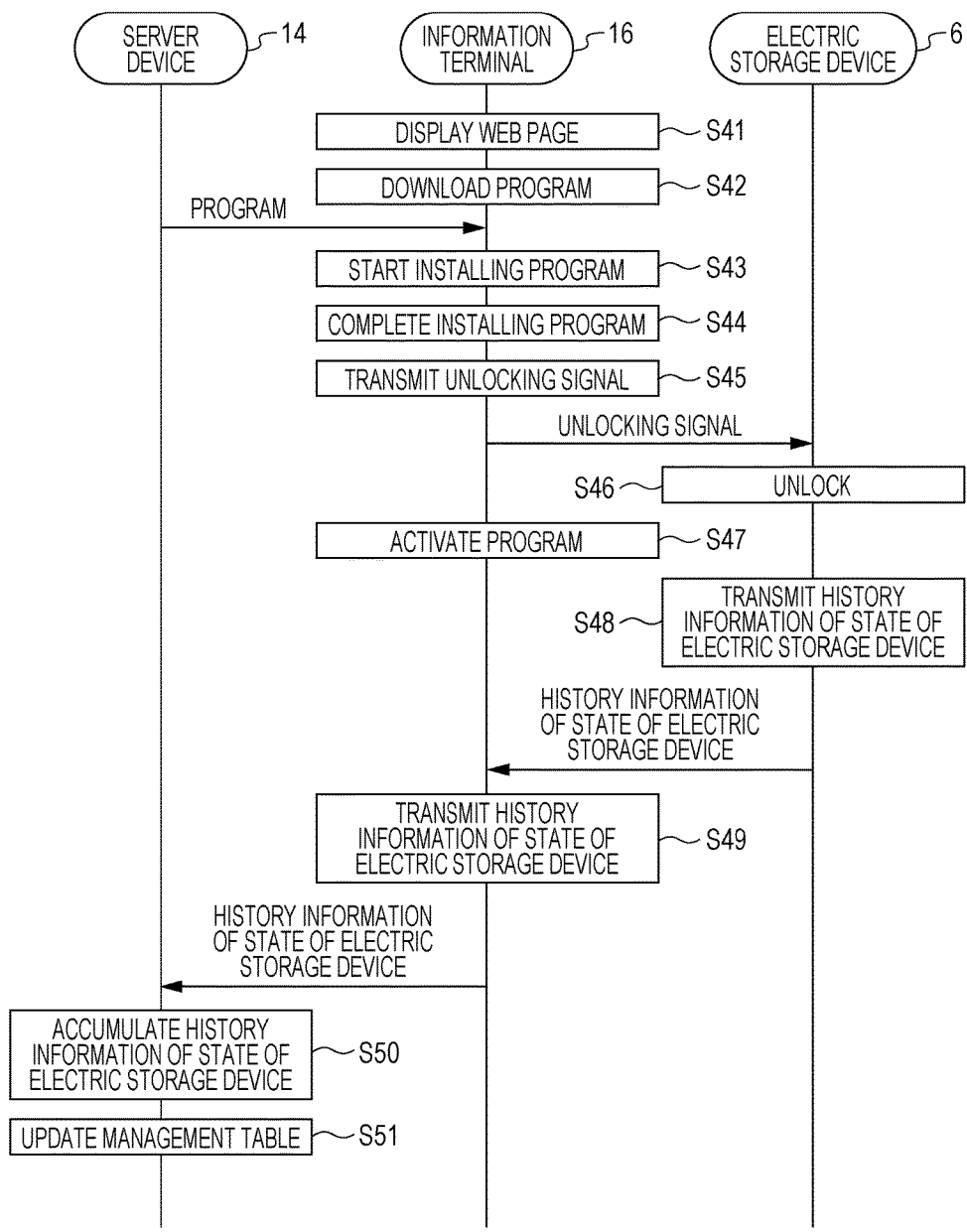
FIG. 7 is a sequence diagram illustrating processing for transmitting history information of a state of the electric storage device in the rental system according to Embodiment 2.

2-1. Processing for Transmitting History Information of State of Electric Storage Device Next, processing for transmitting history information of a state of an electric storage device 6 in a rental system 2A (see FIG. 1) according to Embodiment 2 is described with reference to FIG. 7. FIG. 7 is a sequence diagram illustrating the processing for transmitting the history information of the state of the electric storage device 6 in the rental system 2A according to Embodiment 2. In each of the embodiments below, constituent elements that are identical to those in Embodiment 1 are given identical reference signs, and description thereof is omitted.

Embodiment 2 is different from Embodiment 1 in terms of a timing of transmission of an unlocking signal. As illustrated in FIG. 7, first, steps S41 through S43 are executed in a manner similar to Steps S21 through S23 of FIG. 6 described in Embodiment 1. Then, installation of a program in an information terminal 16 is completed (S44).

Upon completion of installation of the program in the information terminal 16, a control unit 56 controls a communication unit 48 to transmit an unlocking signal to the electric storage device 6. For example, the control unit 56 controls the communication unit 48 to transmit the unlocking signal to the electric storage device 6 on the basis of a determination signal indicating that installation has been completed. This allows the unlocking signal to be transmitted from the information terminal 16 to the electric storage device 6 (S45) (Step (a)). That is, transmission of the unlocking signal is executed after an input unit 52 accepts an instruction to install the program from a user 8, as in Embodiment 1. In this way, the electric storage device 6 that has been locked in an unusable state is unlocked (S46).

Note that a timing of transmission of the unlocking signal may be the same as a timing of completion of installation of the program or may be any timing after the timing of completion of installation of the program.

Figure 6:
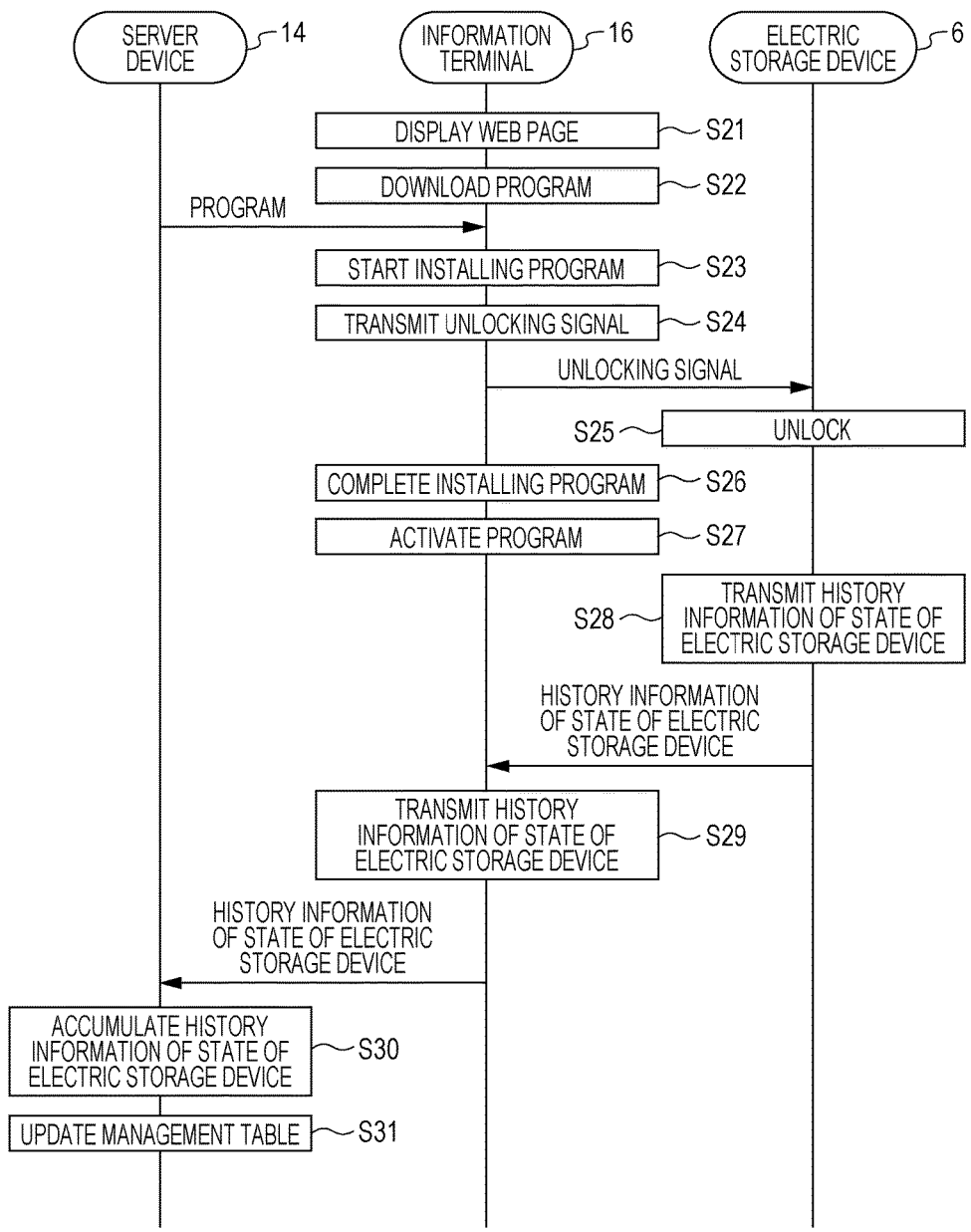
FIG. 6 is a sequence diagram illustrating processing for transmitting history information of a state of the electric storage device in the rental system according to Embodiment 1.

Then, Steps S47 through S51 are executed in a manner similar to Steps S27 through S31 of FIG. 6 described in Embodiment 1.

2-2. Effects

Also in Embodiment 2, an unlocking signal is transmitted from the information terminal 16 to the electric storage device 6 after the input unit 52 accepts an instruction from the user 8 to install the program. This makes it possible to obtain effects similar to those in Embodiment 1.

Embodiment 3

Figure 8:
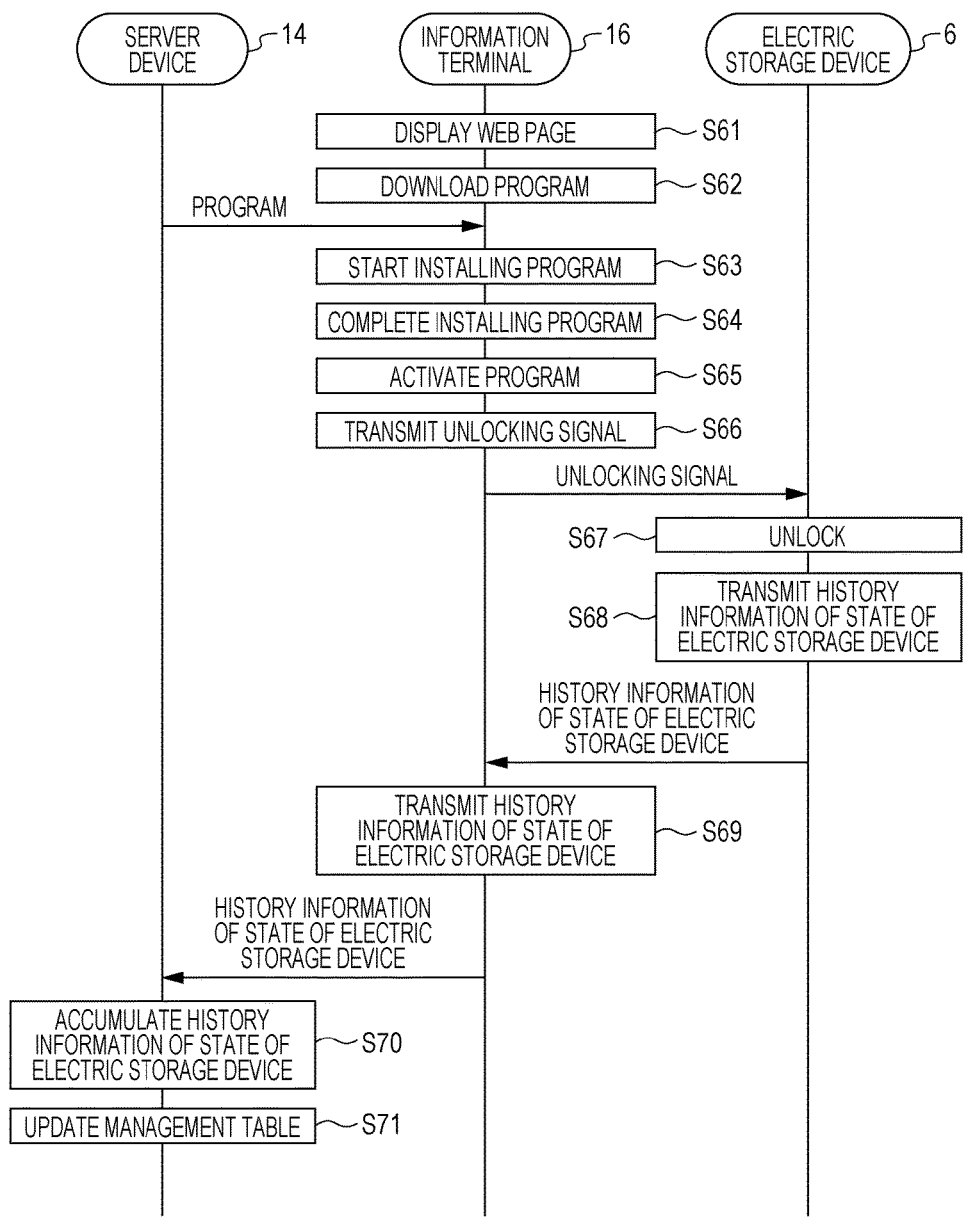
FIG. 8 is a sequence diagram illustrating processing for transmitting history information of a state of the electric storage device in the rental system according to Embodiment 3.

3-1. Processing for Transmitting History Information of State of Electric Storage Device Next, processing for transmitting history information of a state of an electric storage device 6 in a rental system 2B (see FIG. 1) according to Embodiment 3 is described with reference to FIG. 8. FIG. 8 is a sequence diagram illustrating the processing for transmitting the history information of the state of the electric storage device 6 in the rental system 2B according to Embodiment 3.

Embodiment 3 is different from Embodiment 1 in terms of a timing of transmission of an unlocking signal. As illustrated in FIG. 8, first, Steps S61 through S63 are executed in a manner similar to Steps S21 through S23 of FIG. 6 described in Embodiment 1. Then, installation of a program in an information terminal 16 is completed (S64), and then a user 8 activates the installed program by operating the information terminal 16 (S65).

Upon acceptance of an instruction from the user 8 to activate the program by an input unit 52, a control unit 56 controls a communication unit 48 to transmit an unlocking signal to the electric storage device 6. For example, the control unit 56 controls the communication unit 48 to transmit the unlocking signal to the electric storage device 6 on the basis of a determination signal indicating that the instruction to activate the program has been accepted. This allows the unlocking signal to be transmitted from the information terminal 16 to the electric storage device 6 (S66) (Step (a)). That is, transmission of the unlocking signal is executed after the input unit 52 accepts an instruction from the user 8 to activate the program. In this way, the electric storage device 6 that has been locked in an unusable state is unlocked (S67).

Note that a timing of transmission of the unlocking signal may be the same as a timing at which the input unit 52 accepts the instruction from the user 8 to activate the program or may be any timing after the timing at which the input unit 52 accepts the instruction from the user 8 to activate the program.

Then, Steps S68 through S71 are executed in a manner similar to Steps S28 through S31 of FIG. 6 described in Embodiment 1.

3-2. Effects

In Embodiment 3, an unlocking signal is transmitted from the information terminal 16 to the electric storage device 6 after the input unit 52 accepts an instruction from the user 8 to activate the program. That is, after the user 8 completes preparation (activation of the program) for transmission of the history information of the state of the electric storage device 6 from the information terminal 16 to a server device 14, an unlocking signal is transmitted from the information terminal 16 to the electric storage device 6 to unlock the electric storage device 6. This makes it possible to obtain effects similar to those in Embodiment 1.

3-3. Modification

In Embodiment 3, upon acceptance of the instruction from the user 8 to activate the program by the input unit 52, the control unit 56 controls the communication unit 48 to transmit an unlocking signal to the electric storage device 6. Instead of such an arrangement, the control unit 56 may control the communication unit 48 to transmit an unlocking signal to the electric storage device 6 upon completion of activation of the program. For example, the control unit 56 controls the communication unit 48 to transmit an unlocking signal to the electric storage device 6 on the basis of a determination signal indicating that activation of the program has been completed.

In this case, a timing of transmission of the unlocking signal may be the same as a timing of completion of activation of the program or may be any timing after the timing of completion of activation of the program.

Embodiment 4

Figure 9:
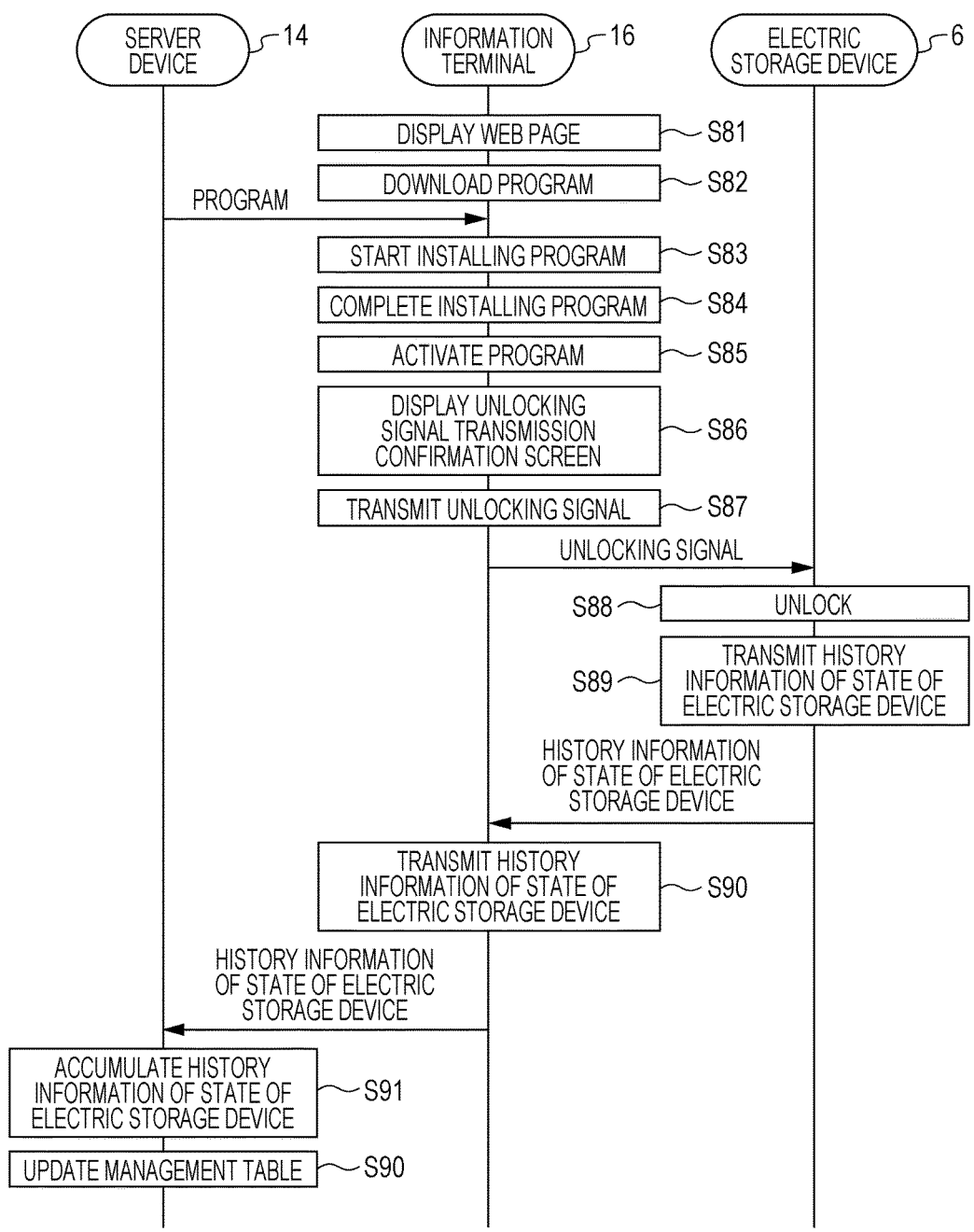
FIG. 9 is a sequence diagram illustrating processing for transmitting history information of a state of the electric storage device in the rental system according to Embodiment 4.
Figure 10:
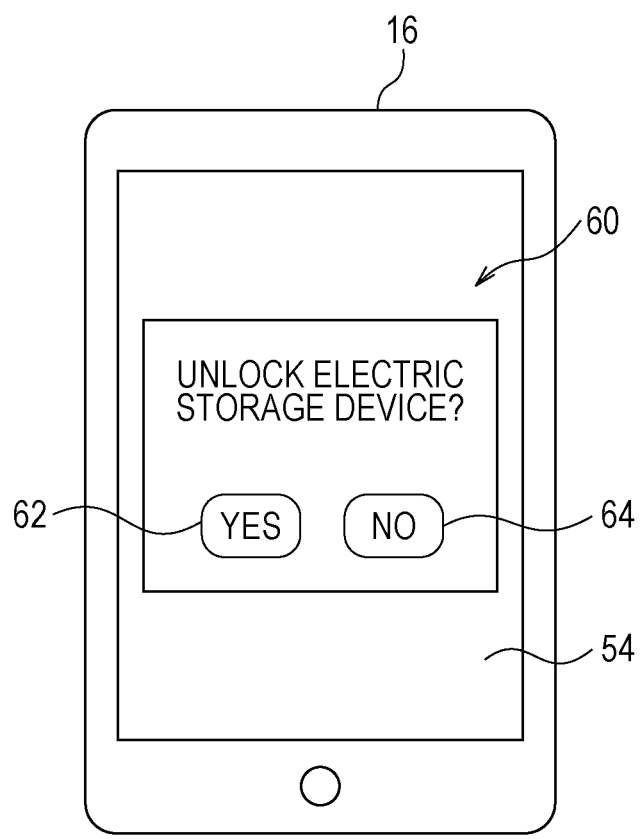
FIG. 10 is a diagram illustrating an example of a confirmation screen displayed on the information terminal according to Embodiment 4.

4-1. Processing for Transmitting History Information of State of Electric Storage Device Next, processing for transmitting history information of a state of an electric storage device 6 in a rental system 2C (see FIG. 1) according to Embodiment 4 is described with reference to FIGS. 9 and 10. FIG. 9 is a sequence diagram illustrating the processing for transmitting the history information of the state of the electric storage device 6 in the rental system 2C according to Embodiment 4. FIG. 10 is a diagram illustrating an example of a confirmation screen 60 displayed on an information terminal 16 according to Embodiment 4.

Embodiment 4 is different from Embodiment 1 in terms of a timing of transmission of an unlocking signal. As illustrated in FIG. 9, first, Steps S81 through S83 are executed in a manner similar to Steps S21 through S23 of FIG. 6 described in Embodiment 1. Then, installation of a program in the information terminal 16 is completed (S84), and a user 8 activates the installed program by operating the information terminal 16 (S85).

Then, as illustrated in FIG. 10, a control unit 56 of the information terminal 16 causes a display unit 54 to display the confirmation screen 60 for confirming transmission of an unlocking signal on the basis of the installed program (S86) (Step (b) and Step (c)). Then, in a case where the user 8 taps a button 62 of the confirmation screen 60 with a finger, an input unit 52 accepts an instruction from the user 8 to transmit an unlocking signal. This allows the unlocking signal to be transmitted from the information terminal 16 to the electric storage device 6 (S87) (Step (a)). That is, transmission of the unlocking signal is executed after the input unit 52 accepts an instruction from the user 8 to activate the program (or after the input unit 52 accepts an instruction from the user 8 to install the program). In this way, the electric storage device 6 that has been locked in an unusable state is unlocked (S88).

Note that in a case where the user 8 taps a button 64 of the confirmation screen 60 with a finger in Step S86, the unlocking signal is not transmitted from the information terminal 16 to the electric storage device 6.

Then, Steps S89 through S92 are executed in a manner similar to Steps S28 through S31 of FIG. 6 described in Embodiment 1.

4-2. Effects

In Embodiment 4, an unlocking signal is transmitted from the information terminal 16 to the electric storage device 6 after the input unit 52 accepts an instruction from the user 8 to activate the program (or after the input unit 52 accepts an instruction from the user 8 to install the program). This makes it possible to obtain effects similar to those in Embodiment 1.

Furthermore, since the confirmation screen 60 is displayed on the display unit 54, the user 8 can give an instruction to transmit an unlocking signal to the electric storage device 6 in accordance with the confirmation screen 60.

Embodiment 5

Figure 11:
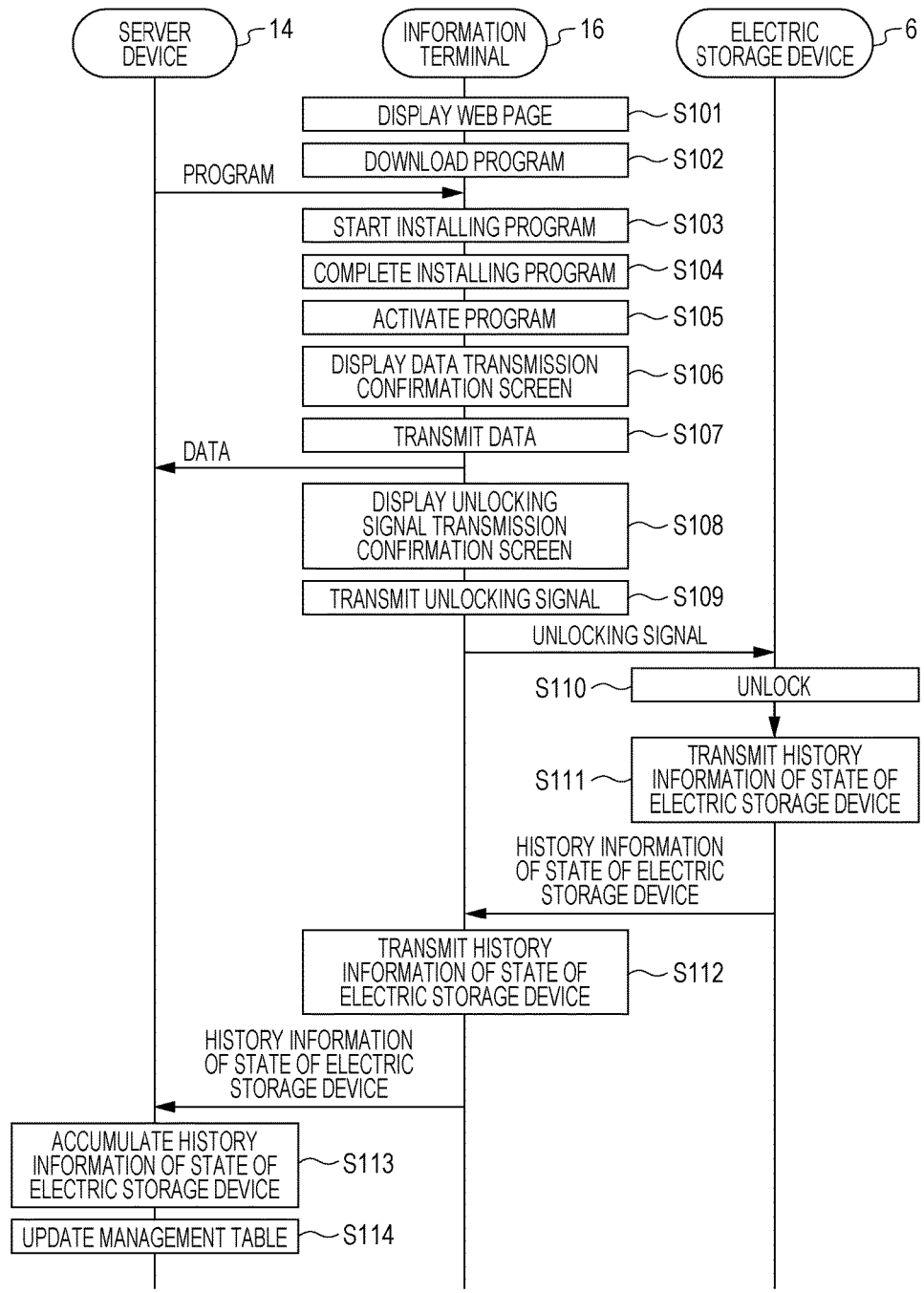
FIG. 11 is a sequence diagram illustrating processing for transmitting history information of a state of the electric storage device in the rental system according to Embodiment 5.
Figure 12:
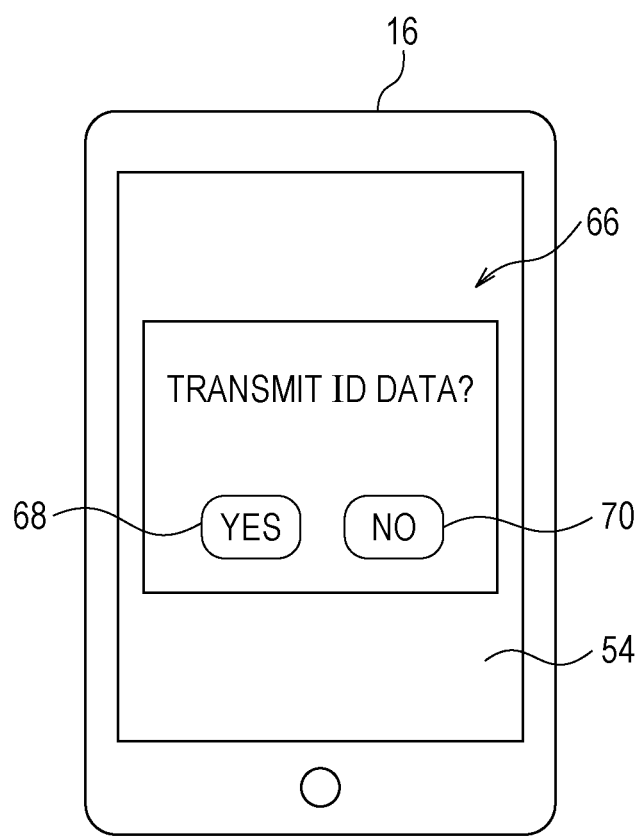
FIG. 12 is a diagram illustrating an example of a confirmation screen displayed on the information terminal according to Embodiment 5.

5-1. Processing for Transmitting History Information of State of Electric Storage Device Next, processing for transmitting history information of a state of an electric storage device 6 in a rental system 2D (see FIG. 1) according to Embodiment 5 is described with reference to FIGS. 11 and 12. FIG. 11 is a sequence diagram illustrating the processing for transmitting the history information of the state of the electric storage device 6 in the rental system 2D according to Embodiment 5. FIG. 12 is a diagram illustrating an example of a confirmation screen 66 displayed on an information terminal 16 according to Embodiment 5.

Embodiment 5 is different from Embodiment 1 in terms of a timing of transmission of an unlocking signal. As illustrated in FIG. 11, first, Steps S101 through S103 are executed in a manner similar to Steps S21 through S23 of FIG. 6 described in Embodiment 1. Then, installation of a program in the information terminal 16 is completed (S104), and a user 8 activates the installed program by operating the information terminal 16 (S105).

Then, as illustrated in FIG. 12, a control unit 56 of the information terminal 16 causes a display unit 54 to display the confirmation screen 66 for confirming transmission, to a server device 14, of data in which a user ID (an example of information concerning the user 8) and an electric storage device ID (an example of information concerning the electric storage device 6) are associated with each other on the basis of the installed program (S106) (Step (e)). Then, in a case where the user 8 taps a button 68 of the confirmation screen 66 with a finger, an input unit 52 accepts an instruction from the user 8 to transmit the data to the server device 14. This allows the data to be transmitted from the information terminal 16 to the server device 14 (S107) (Step (d)).

Note that in a case where the user 8 taps a button 70 of the confirmation screen 66 with a finger in Step S106, the data is not transmitted from the information terminal 16 to the server device 14.

Then, the control unit 56 of the information terminal 16 causes the display unit 54 to display a confirmation screen 60 (see FIG. 10) for confirming transmission of an unlocking signal on the basis of the installed program (S108) (Step (b) and Step (c)). Then, in a case where the user 8 taps a button 62 of the confirmation screen 60 with a finger, the unlocking signal is transmitted from the information terminal 16 to the electric storage device 6 (S109) (Step (a)). That is, transmission of the unlocking signal is executed after an input unit 52 accepts an instruction from the user 8 to activate the program (or after the input unit 52 accepts an instruction from the user 8 to install the program). In this way, the electric storage device 6 that has been locked in an unusable state is unlocked (S110).

Then, Steps S111 through S114 are executed in a manner similar to Steps S28 through S31 of FIG. 6 described in Embodiment 1.

5-2. Effects

Also in Embodiment 5, an unlocking signal is transmitted from the information terminal 16 to the electric storage device 6 after the input unit 52 accepts an instruction from the user 8 to activate the program (or after the input unit 52 accepts an instruction from the user 8 to install the program). This makes it possible to obtain effects similar to those in Embodiment 1.

Furthermore, since the confirmation screen 66 is displayed on the display unit 54, the user 8 can give an instruction to transmit the data to the server device 14 in accordance with the confirmation screen 66.

5-3. Modification

In Embodiment 5, data in which a user ID and an electric storage device ID are associated with each other is transmitted to the server device 14 in Step S107. In this data, information concerning an electric apparatus 4 in which the electric storage device 6 is mounted may be further associated. The information concerning the electric apparatus 4 is, for example, information indicative of a type (e.g., an electric bicycle) of the electric apparatus 4.

Furthermore, in Step S107, only any one of the user ID and the electric storage device ID may be transmitted to the server device 14.

The information concerning the user 8 transmitted in Step S107 is not limited to the user ID and may be, for example, any information such as data in which an identification number of the user 8 and name and address of the user 8 are associated with each other or an information terminal ID for identifying the information terminal 16 operated by the user 8.

Furthermore, the information concerning the electric storage device 6 transmitted in Step S107 is not limited to the electric storage device ID and may be, for example, any information such as an identification number of the electric storage device 6 or state information of the electric storage device 6. The state information of the electric storage device 6 is, for example, information indicative of a voltage, a temperature, a capacity, and the like of the electric storage device 6.

Other Modification

A method for controlling the information terminal 16 according to one or a plurality of aspects has been described above on the basis of the embodiments, but the present disclosure is not limited to these embodiments. Various modifications of the embodiments which a person skilled in the art can conceive of and combinations of constituent elements in different embodiments or modifications may be encompassed within a scope of the one or a plurality of aspects without departing from the spirit of the present disclosure.

In each of the embodiments, the electric apparatus 4 is an electric bicycle, but is not limited to this. For example, the electric apparatus 4 can be an electric scooter, an electric car, or the like. Note that the electric apparatus 4 is not limited to an apparatus for transportation.

In each of the embodiments above, the switch 46 is a semiconductor switch, but is not limited to this. The switch 46 may be, for example, a mechanical switch that is mechanically turned on and off.

In the above embodiments, each of the constituent elements may be realized by special hardware or may be realized by execution of a software program suitable for the constituent element. Each of the constituent elements may be realized in a manner such that a program execution unit such as a CPU or a processor reads out and executes a software program recorded in a recording medium such as a hard disc or a semiconductor memory.

The following cases are also encompassed within the present disclosure.

(1) Each of the above devices can be realized specifically by a computer system constituted by a microprocessor, a ROM, a RAM, a hard disc unit, a display unit, a keyboard, a mouse, and the like. A computer program is stored in the RAM or the hard disc unit. The microprocessor operates in accordance with the computer program, and thus each of the devices accomplishes a function thereof. The computer program is a combination of a plurality of command codes indicating an instruction for a computer for accomplishment of a predetermined function.

(2) One or more of the constituent elements that constitute each of the above devices may be realized by a single system LSI (Large Scale Integration). The system LSI is a super-multifunctional LSI produced by integrating a plurality of elements on a single chip. Specifically, the system LSI is a computer system including a processor, a ROM, a RAM, and the like. A computer program is stored in the ROM. The microprocessor loads the computer program from the ROM into the RAM and performs an operation such as computation in accordance with the loaded computer program. In this way, the system LSI accomplishes a function thereof.

(3) One or more of the constituent elements that constitute each of the above devices may be realized by an IC card that is detachably attached to the device or a stand-alone module. The IC card or the module is a computer system that is constituted by a microprocessor, a ROM, a RAM, and the like. The IC card or the module may include the super-multifunctional LSI. The microprocessor operates in accordance with the computer program, and thus the IC card or the module accomplishes a function thereof. The IC card or the module may has tamper resistance.

(4) The present disclosure may be the methods described above. The present disclosure may be a computer program that achieves these methods by a computer or may be a digital signal made up of the computer program.

(5) The present disclosure may be a computer-readable recording medium such as a flexible disc, a hard disc, a CD-ROM, an MO, a DVD, a DVD-ROM, a DVD-RAM, a BD (Blu-ray (Registered Trademark) Disc), or a semiconductor memory, in which the computer program or the digital signal is stored. Alternatively, the present disclosure may be the digital signal stored in these recording media.

The present disclosure may be the computer program or the digital signal transmitted via an electrical communication line, a wireless or wired communication line, a network represented by the Internet, data broadcasting, or the like.

The present disclosure may be a computer system including a microprocessor operating in accordance with the computer program and a memory storing therein the computer program.

The program or the digital signal may be executed by another independent computer system by recording the program or the digital signal on the recording medium and delivering the recording medium or by delivering the program or the digital signal over the network or the like.

(5) The embodiments and modifications may be combined.

A method for controlling an information terminal and an information terminal according to the present disclosure are applicable, for example, to a rental system for renting an electric storage device, or the like.

What is claimed is:

1. A method comprising:
    transmitting a signal for unlocking an electric storage device locked in a state unable to discharge to an electric apparatus to the electric storage device at least one of a timing after an operator's instruction to install a program, in an information terminal, for transmitting history information of a state of the electric storage device to a server device is accepted and a timing after an operator's instruction to activate the program in the information terminal is accepted,
    wherein the electric storage device is separable from the electric apparatus to which it is to be mounted and supplies electric power, and separately locked from the electric apparatus,
    wherein the electric storage device is separable from a charging device to which it is to be mounted and from which it is to be charged; and
    wherein the electric storage device is locked in the state unable to discharge to the electric apparatus even when the electric storage device is mounted to the electric apparatus.

2. The method according to claim 1, wherein the signal for unlocking the electric storage device is transmitted to the electric storage device upon acceptance of the operator's instruction to install the program.

3. The method according to claim 1, wherein the signal for unlocking the electric storage device is transmitted to the electric storage device upon completion of installation of the program.

4. The method according to claim 1, further comprising:
    displaying, on a display, a screen for confirming transmission of the signal for unlocking the electric storage device after the operator's instruction to install the program is accepted,
    wherein the transmitting of the signal for unlocking the electric storage device is executed upon acceptance of an operator's instruction to transmit the signal for unlocking the electric storage device to the electric storage device after the displaying of the screen for confirming transmission of the signal.

5. The method according to claim 1, wherein the signal for unlocking the electric storage device is transmitted to the electric storage device upon acceptance of the operator's instruction to activate the program.

6. The method according to claim 1, wherein the signal for unlocking the electric storage device is transmitted to the electric storage device upon completion of activation of the program.

7. The method according to claim 1, further comprising:
    displaying, on a display, a screen for confirming transmission of the signal for unlocking the electric storage device after the operator's instruction to activate the program is accepted,
    wherein the transmitting of the signal for unlocking the electric storage device is executed upon acceptance of an operator's instruction to transmit the signal for unlocking the electric storage device to the electric storage device after the displaying of the screen for confirming transmission of the signal.

8. The method according to claim 1, further comprising:
    transmitting at least one of information concerning the electric storage device and information concerning a user of the electric storage device to the server device,
    wherein the transmitting of the signal for unlocking the electric storage device is executed after the transmitting of at least one of the information concerning the electric storage device and the information concerning the user of the electric storage device.

9. The method according to claim 4, further comprising:
    transmitting at least one of information concerning the electric storage device and information concerning a user of the electric storage device to the server device,
    wherein the displaying of the screen for confirming transmission of the signal is executed after the transmitting of at least one of the information concerning the electric storage device and the information concerning the user of the electric storage device.

10. The method according to claim 7, further comprising:
    transmitting at least one of information concerning the electric storage device and information concerning a user of the electric storage device to the server device,
    wherein the displaying of the screen for confirming transmission of the signal is executed after the transmitting at least one of the information concerning the electric storage device and the information concerning the user of the electric storage device.

11. The method according to claim 8, further comprising:
    displaying, on a display, a screen for confirming transmission of the at least one of the information concerning the electric storage device and the information concerning the user of the electric storage device to the server device after the operator's instruction to activate the program is accepted,
wherein the transmitting at least one of the information concerning the electric storage device and the information concerning the user of the electric storage device is executed upon acceptance of an operator's instruction to transmit the at least one of the information concerning the electric storage device and the information concerning the user of the electric storage device to the server device after the displaying, on the display, the screen for confirming transmission of the at least one of the information concerning the electric storage device and the information concerning the user of the electric storage device.

12. The method according to claim 8, wherein information concerning an electric apparatus in which the electric storage device is mounted is further transmitted in the transmitting at least one of the information concerning the electric storage device and the information concerning the user of the electric storage device.

13. The method according to claim 8, wherein data in which identification information of the electric storage device and identification information of the user of the electric storage device are associated with each other is further transmitted to the server device in the transmitting at least one of the information concerning the electric storage device and the information concerning the user of the electric storage device.

14. The method according to claim 13, wherein information concerning the electric apparatus in which the electric storage device is mounted is further associated in the data.

15. The method according to claim 1, wherein the program is a program for acquiring the history information of the state of the electric storage device from the electric storage device and then transmitting the history information of the state of the electric storage device to the server device.

16. An information terminal comprising:
an acceptor that accepts an operator's instruction to install a program for transmitting history information of a state of an electric storage device to a server device;
a communicator that communicates with the electric storage device; and
a controller that transmits a signal for unlocking the electric storage device locked in a state unable to discharge to an electric apparatus to the electric storage device via the communicator at least a timing after the acceptor accepts an operator's instruction to install the program and a timing after the acceptor accepts an operator's instruction to activate the program,
wherein the electric storage device is separable from the electric apparatus to which it is to be mounted and supplies electric power, and separately locked from the electric apparatus,
wherein the electric storage device is separable from a charging device to which it is to be mounted and from which it is to be charged-; and
wherein the electric storage device is locked in the state unable to discharge to the electric apparatus even when the electric storage device is mounted to the electric apparatus.

17. The method according to claim 1, wherein the signal is a signal for unlocking operation of a locking device, the locking device being provided with the electric storage device to lock the electric storage device in the state unable to discharge.

18. The method according to claim 1, wherein the electric storage device is electronically locked, such that the electric storage device is unable to provide electric power to the electric apparatus.

19. The method according to claim 1, wherein the electric storage device is locked in the state unable to discharge to the electric apparatus at least one of a timing before an operator's instruction to install a program, in an information terminal, for transmitting history information of a state of the electric storage device to a server device is accepted and a timing after an operator's instruction to activate the program in the information terminal is accepted.

* * * * *